United States Patent [19]
Kron

[11] 3,720,097
[45] March 13, 1973

[54] APPARATUS AND METHOD FOR MEASURING MAMMALIAN BLOOD VISCOSITY

[75] Inventor: Reuben E. Kron, Penn Valley, Pa.

[73] Assignee: The Trustees of the University of Pennsylvania, Philadelphia, Pa.

[22] Filed: Jan. 21, 1971

[21] Appl. No.: 108,433

[52] U.S. Cl. ...................................73/55, 73/205 L
[51] Int. Cl. ..............................................G01n 11/08
[58] Field of Search ..............................73/55, 205 L

[56] References Cited

UNITED STATES PATENTS 3,342,063   9/1967   Smythe et al. ............................73/55

OTHER PUBLICATIONS

Swank, R. L., et al. Apparatus for Measuring Relative Blood Viscosity in Rev. of Sci. Inst. 25(10): pp. 1020–1022, Oct. 1954.

Primary Examiner—Louis J. Capozi
Assistant Examiner—Joseph W. Roskos
Attorney—Paul & Paul

[57] ABSTRACT

A diagnostic method and apparatus are disclosed by which instantaneous measurements are obtained which reflect the viscosity of native mammalian blood. A sample of fresh mammalian blood is taken by puncturing a blood vessel and introduced into a system including (1) a capillary calibrated to deliver 20 ml. of saline solution in one minute at −50 mm. Hg. at 37°C., (2) an electromagnetic flowmeter which senses the flow rate of the blood through the capillary, (3) a programmed vacuum pump which draws the blood sample through the capillary at a variety of pressures, and (4) recording means to instantaneously plot the resultant of the blood flow with respect to pressure variations.

5 Claims, 2 Drawing Figures

APPARATUS AND METHOD FOR MEASURING MAMMALIAN BLOOD VISCOSITY

BACKGROUND OF THE INVENTION

1. Field of the invention

This invention relates to the measurement of the viscosity of fresh mammalian blood.

2. Description of the prior art

No known methodology or instrumentation is known to me which accurately portrays the viscous properties of native mammalian blood. Native blood is the fluid which circulates within the blood vessels, or is freshly drawn therefrom, prior to the onset of clotting or other significant alterations in physicochemical properties. While the fluidity of blood may be measured by an ultrasonically vibrated probe and a computer, the blood must first be denatured with anticoagulants; the red cells undergo sedimentation during the measurement; and the energy imparted by the vibrating probe may also alter physical characteristics of the blood. Similar technical problems have been associated with all methods known to me, including the usual "drag type" and capillary viscometers.

Most current viscometric methods depend upon the measurement of the shear rate of a fluid at only a few points of shear stress, and obtain intervening values by extrapolation. Because blood, like other biological fluids are so complex in physical characteristics, and may vary significantly in rheological properties depending upon the magnitude of the shear stress, it is hazardous to generalize from only a few measures. Also, such methods do not necessarily provide shear values representative of conditions existing within living systems.

SUMMARY OF THE INVENTION

In order to overcome the limitations imposed by the prior art methods and apparatus, the apparatus and process of this invention have the following objects:

1. To provide flow conditions for fresh blood analogous to those existing within the vascular system.

2. To measure the viscous qualities of fresh blood throughout the range of pressures and flows representative of in vivo conditions and before significant physicochemical alterations occur.

3. To be accurate, reliable, innocuous, and capable of use as a simple bedside procedure.

4. To provide a record of an infinite number of individual viscosity determinations for a blood sample over a predetermined range of flow conditions.

DESCRIPTION OF THE PREFERRED EMBODIMENTS

Figure 1:
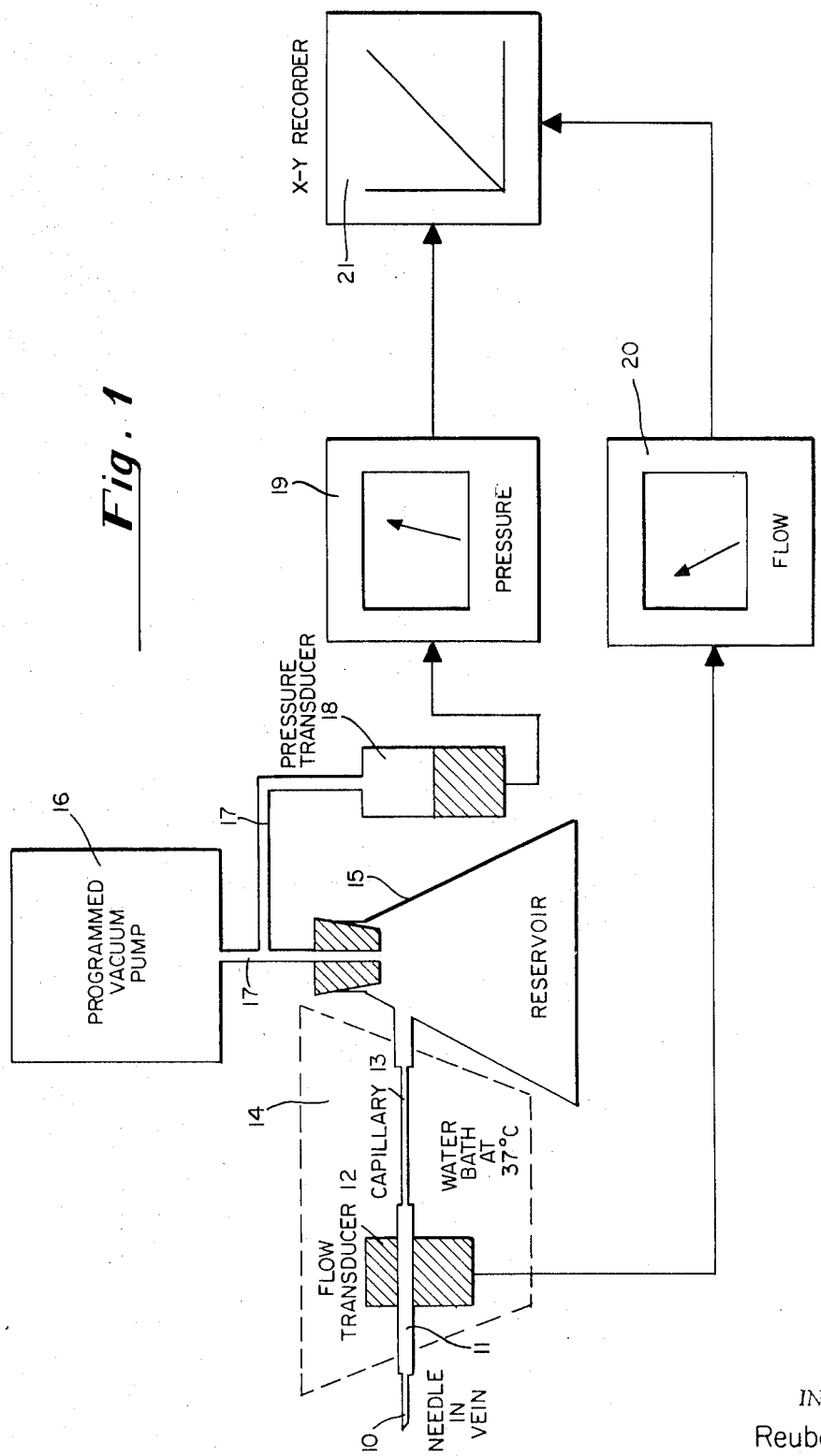
FIG. 1 is a schematic diagram of the instrumentation of an embodiment of this invention.

Referring now to FIG. 1, there is shown schematically a blood viscosity measuring apparatus suitable for use at the site of the donor. A conventional hypodermic needle 10 is utilized to puncture a blood vessel, and the exiting blood flows through a tubing 11 connected thereto. The tubing 11 leads into a water bath 14 which is maintained at a temperature of 37°C. A flow transducer 12 is utilized to measure the flow rate of the blood as it flows into the capillary 13. The capillary 13 discharges the blood into a stoppered reservoir 15, which is maintained under vacuum by a programmed vacuum pump 16. Tubing 17 connects the vacuum pump 16 to the reservoir 15 and a pressure transducer 18. The pressure transducer 18 actuates a pressure indicating and transmitting instrument 19, and the flow transducer 12 actuates a flow indicating and transmitting instrument 20. The pressure instrument 19 and the flow instrument 20 transmit their respective measurements to the X-Y recorder 21 which simultaneously plots the pressure as the ordinate and the flow as the abscissa of the resulting curve. The capillary 13 is fabricated to have an inner diameter of 0.033 inches (838 microns), which is representative of those portions of the vasculature in which blood behaves as a homogeneous Newtonian fluid, closely obeying Poiseuille's law. The flow transducer 12 electromagnetically senses the rate of blood flow into the capillary 13 and transmits an induced electrical signal to the flow instrument 20. Suitable flow transducers and flow instruments are commercially available from Carolina Medical Electronics, Inc., P. O. Box 307, King, North Carolina, 27021, and Statham Instruments, Inc., 2230 Statham Boulevard, Oxnard, Califorina, 93030. A conventional blood pressure transducer has been used (Statham Laboratories, Inc., Tres Monjitas Industrial Subdivision, P. O. Box 1178, Hato Rey, Puerto Rico, 00919). A conventional X-Y recorder is manufactured by Houston Instrument Corp., Houston, Texas.

EXAMPLE 1

Figure 2:
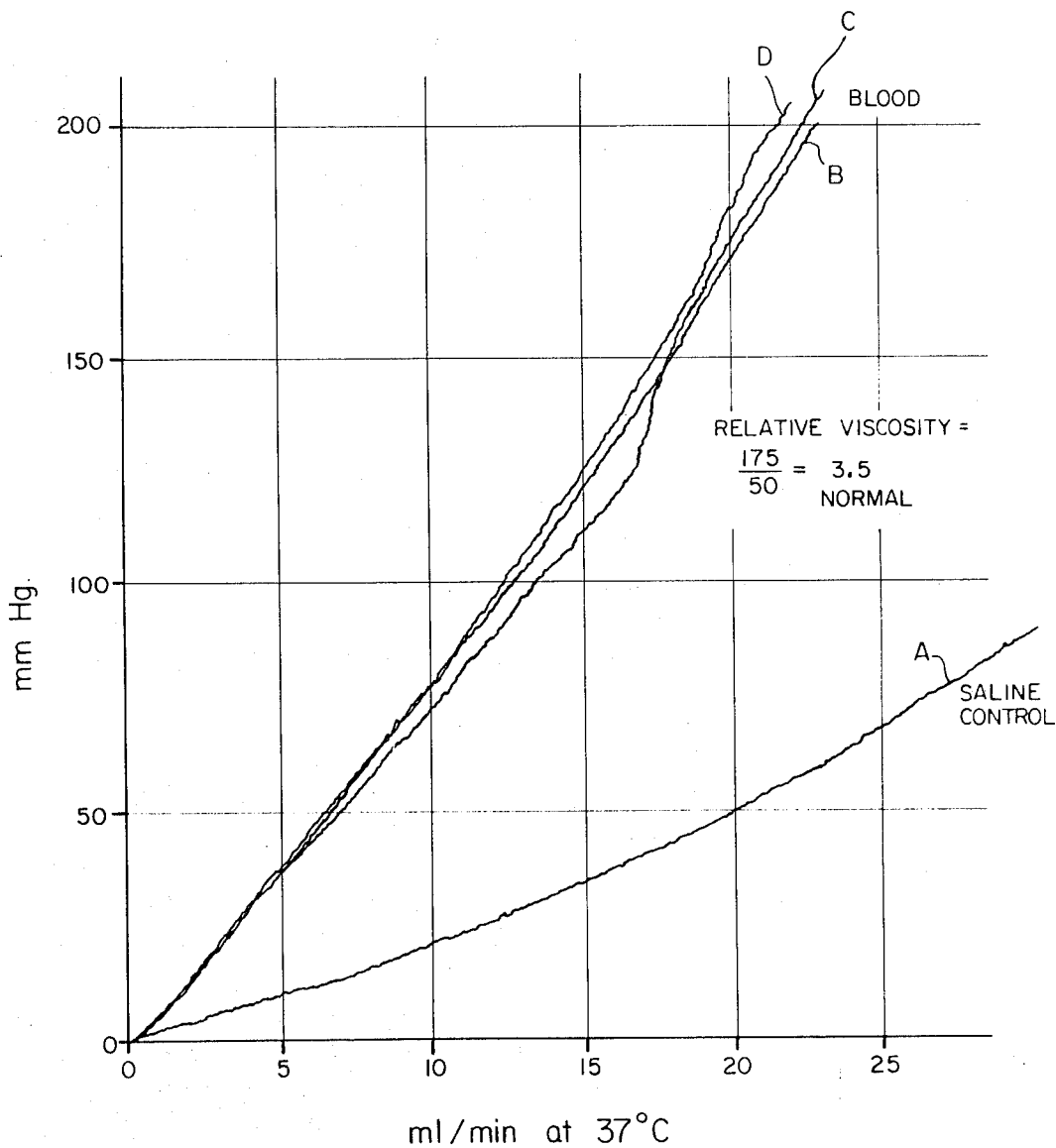
FIG. 2 is a reproduction of a record of the blood viscosity measurements obtained by utilizing the apparatus and process of this invention.

A healthy volunteer donated a blood sample which was tested by using the apparatus and method of this invention, producing the viscosity data shown in FIG. 2. The lower line (A) is the control curve generated by normal saline solution. The upper lines (B, C and D) were generated by three separate samples drawn from the vein of the volunteer. The instrument was calibrated to deliver 20 ml. of saline in 1 minute at −50 mm. Hg. at 37° C. The relative viscosity of blood is calculated by comparing the height of the saline and blood curves at corresponding flow rates. Therefore at 20 ml/min, with the saline curve at 50 mm Hg and the blood curves at ca. 175 mm Hg., the viscosity of this blood sample relative to saline is 175/50, or 3.5. This ratio is within the normal range of blood viscosities (3–4) as observed by comparison among samples taken from 10 young volunteers.

Various studies have thus far been made utilizing the method and apparatus of this invention. 23 young women attending a Family Planning Clinic were studied. The majority had normal blood viscosity measurements. One of three such women who were receiving oral contraceptives showed an increased blood viscosity. Only one other women, an extremely overweight individual had an elevated blood viscosity. Among five surgical patients studied there was considerable variability in the blood viscosity response. Determinations were made before and after surgery. Two of the patients had elevated blood viscosities prior to surgery, but were normal 2 days after the operation.

One patient had a normal blood viscosity prior to the operation, but remained elevated for 10 days after the procedure. Another patient underwent bowel sterilization in preparation for resection of the colon, and evidenced marked increases in blood viscosity and hematocrit prior to surgery. His blood picture did not return to normal until he recovered sufficiently to begin on solid foods. Among seven patients suffering from thrombophlebitis, all had abnormally high relative blood viscosities ranging from 4.3 to 8.0. The highest viscosities were found in the three patients with chronic phlebitis who also had elevated hematocrits (50 to 59). Four patients with acute thrombophebitis had elevated viscosities with normal hematocrits (43 to 45). Factors other than red cell concentration may be responsible for the decreased blood fluidity of such patients. For example, when treated with intravenous heparin twice daily, there was a reduction in viscosity associated with decreased symptoms and signs of acute phlebitis. One patient with acute phlebitis was being followed daily by viscosity measures. During a remission of symptoms intravenous heparin was discontinued. An exacerbation of the phlebitis was presaged by a significant rise in blood viscosity on the day before the acute symptoms returned.

Having thus described my invention, I claim:

1. The method of measuring the viscosity of native mammalian blood which comprises:
   1. taking a blood sample,
   2. establishing a laminar flow of the blood sample within a constricted space,
   3. varying the flow rate of said sample by varying the pressure thereof,
   4. instanteously sensing the flow rate and varying pressure,
   5. continuously recording the relationship between the sensed flow rate and varying pressure as a representation of viscosity.

2. An apparatus for measuring the viscosity of native mammalian blood comprising in combination:
   1. capillary means,
   2. means for supplying native blood to said capillary means,
   3. means for causing varying flow rate of blood through said capillary means by varying the flow pressure thereon,
   4. sensing means adapted to instantaneously measure the flow rate through the capillary and the corresponding flow pressure,
   5. recording means adapted to continuously record the relationship between the sensed measurements of flow rate and flow pressure as a representation of viscosity.

3. The apparatus of claim 2 wherein said means for supplying native blood to said capillary means includes (1) supply means connected to an inlet opening to said capillary, (2) vacuum means connected to an outlet opening of said capillary, and temperature control means adapted to maintain said supply of native blood at normal blood temperatures.

4. The apparatus of claim 3 wherein said vacuum means includes a blood receiving means connected to an outlet opening of said capillary and programmable vacuum pump means connected to an outlet of said blood receiving means, said blood receiving means being adapted to transmit subatmospheric pressure from said vacuum pump means to said capillary means and being further adapted to receive blood from said capillary means while preventing the transmission of blood to said vacuum pump means.

5. The apparatus of claim 4 wherein the recording means is adapted to continuously record the sensed measurements of flow rate and flow pressure respectively as abscissas and ordinates of a line curve.

* * * * *